(12) United States Patent
Toillon et al.

(10) Patent No.: US 10,320,575 B2
(45) Date of Patent: Jun. 11, 2019

(54) MESSAGE EXCHANGE AND GENERIC COMMUNICATIONS CONTROLLER STRUCTURE FOR REDUNDANT AVIONICS COMMUNICATION SYSTEMS

(71) Applicant: THALES, Courbevoie (FR)

(72) Inventors: Patrice Toillon, Meudon la Foret (FR); Tarik Aegerter, Meudon la Foret (FR); Xavier Moreau, Meudon la Foret (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/665,168

(22) Filed: Mar. 23, 2015

(65) Prior Publication Data
US 2015/0271007 A1  Sep. 24, 2015

(30) Foreign Application Priority Data

Mar. 24, 2014  (FR) ...................................... 14 00708

(51) Int. Cl.
*H04L 12/10* (2006.01)
*H04L 12/24* (2006.01)

(52) U.S. Cl.
CPC .......... *H04L 12/10* (2013.01); *H04L 41/0654* (2013.01)

(58) Field of Classification Search
CPC ...... H04L 41/0654; H04L 67/12; H04L 12/10
See application file for complete search history.

(56) References Cited

U.S. PATENT DOCUMENTS

| 4,995,040 A * | 2/1991 | Best ...................... G06F 11/184 714/797 |
| 8,396,137 B1 * | 3/2013 | Norby ....................... H04L 1/22 370/257 |
| 9,400,722 B2 * | 7/2016 | Diekema ............. G06F 11/1683 |
| 2008/0013569 A1 * | 1/2008 | Boren ..................... H04L 12/66 370/466 |

(Continued)

FOREIGN PATENT DOCUMENTS

EP  2374714 A2 * 10/2011 ........... B64C 13/503

OTHER PUBLICATIONS

French Search Report for FR 1400708 dated Nov. 10, 2014.
(Continued)

*Primary Examiner* — Benjamin H Elliott, IV
*Assistant Examiner* — Brian P Cox
(74) *Attorney, Agent, or Firm* — B. Aaron Schulman, Esq.; Stites & Harbison, PLLC

(57) ABSTRACT

The invention relates to a message exchange controller structure (1) comprising means (3) forming a message exchange controller, associated with a member (4) forming a storage/exchange buffer, a member (5) forming interfaces for multiple connections to several message production/consumption units, and a member (6) forming interfaces for connecting to several external buses;
which is characterized in that the means exchange controller-forming means (3) are able to recover redundant messages from external buses, store those messages in the storage/exchange buffer-forming member (4), recover those messages from the storage/exchange buffer-forming member (4), and process those messages so as to generate a resultant message (MF), to send it to at least one consumption unit.

14 Claims, 4 Drawing Sheets

(56) References Cited

U.S. PATENT DOCUMENTS

| | | | | |
|---|---|---|---|---|
| 2010/0211984 A1* | 8/2010 | Seo | ................. | H04N 21/44209 |
| | | | | 725/110 |
| 2010/0217408 A1* | 8/2010 | Esch | .................... | H04L 1/0061 |
| | | | | 700/79 |
| 2011/0251739 A1 | 10/2011 | Tomas et al. | | |
| 2014/0344488 A1* | 11/2014 | Flynn | ........................ | G06F 5/14 |
| | | | | 710/52 |
| 2015/0106537 A1* | 4/2015 | Bobrek | .................... | G06F 5/10 |
| | | | | 710/54 |

OTHER PUBLICATIONS

Ian Land and Jeff Elliott: "Architecting ARINC 664, Part 7 (AFDX) Solutions", Application Note: Virtex-4 and Virtex-5 FPGAS, No. version 1.0.1 (May 22, 2009), pp. 1-25, XP007918728, URL:http://www.xilinx.com/support/documentation/application_notes/xapp1130.pdf.

Anonymous: "AFDX / ARINC 664 Tutorial", Aug. 29, 2008 Domaines Techniques (Aug. 29, 2008), pp. 1-30, XP007918727, Recherches (IPC) URL:http://www.techsat.com/fileadmin/media/pdf/infokiosk/TechSAT_TUT-AFDX-EN.pdf * pp. 11-26.

* cited by examiner

MESSAGE EXCHANGE AND GENERIC COMMUNICATIONS CONTROLLER STRUCTURE FOR REDUNDANT AVIONICS COMMUNICATION SYSTEMS

The present invention relates to a message exchange and generic communications controller structure for redundant avionics communication systems.

More particularly, the invention relates to such a message exchange and generic communications controller structure for redundant avionics communication systems, assuming the form of a single component comprising means forming a message exchange controller, associated with at least:
- a member forming a message storage/exchange buffer;
- a member forming interfaces for connecting to several message production/consumption units, one connection interface being associated with one message production/consumption unit; and
- a member forming interfaces for connecting to several external message communication buses, one connection interface being associated with one external message communication bus.

In the state of the art, exchange controller structures are known in particular making it possible to connect avionics equipment to several communication systems at the same time.

These communication systems may be of the same type or different types. In the first case, the systems are called "homogenous"; in the second, they are called "heterogeneous".

The connection of each piece of avionics equipment to different homogenous or heterogeneous communication systems is done directly within the exchange controller-forming means, which thus makes it possible to resolve bulk, assembly and maintenance problems for these items.

However, in the event different communication systems are used to provide physical redundancy by forming several redundancy planes within a same exchange controller, the existing exchange controller structures do not make it possible to manage such redundancy.

One can see that there is then a need to use different actively redundant communication systems to increase the overall availability of transferred data, with time transparency. The availability will be better as a segregation level and/or a dissimilarity level is introduced into its different communication systems.

This is in particular the case for multi-loop or multi-plane systems: two redundant communication planes or a switched system of the ARINC 664 or A664 upgraded type and another type of non-switched communication systems (for example, in a loop with a distributed hub base).

Thus, the existing exchange controller structures are either unusable with such redundant communication systems, or decrease the segregation and/or dissimilarity level introduced by those redundant systems.

One can then see that this results in a complete decrease in the security level.

The present invention relates to a message exchange and generic communications controller structure of the aforementioned type, further making it possible to manage the physical redundancy of communication systems.

To that end, the invention relates to a message exchange and generic communication exchange structure, in which the means forming the message exchange controller are able to:
- recover redundant messages from separate external buses through the corresponding interfaces;
- store those redundant messages in the message storage/exchange buffer-forming member;
- recover those redundant messages from the message storage/exchange buffer-forming member; and
- process those redundant messages so as to generate a resultant message, to send it to at least one message consumption unit through the corresponding interface.

According to other advantageous aspects of the invention, the exchange controller structure comprises one or more of the following features, considered alone or according to all technically possible combinations:

the message exchange controller-forming means are further able to:
- recover at least one message transmitted by at least one message production unit through the corresponding interface;
- store that or those transmitted message(s) in the message storage/exchange buffer-forming member;
- recover that or those transmitted message(s) from the message storage/exchange buffer-forming member; and
- process that or those transmitted message(s) so as to generate a plurality of redundant messages for the or each transmitted message, to send them to separate external buses through the corresponding interfaces;

the message exchange controller-forming means are further able to:
- recover at least one message transmitted by at least one message production unit through the corresponding interface;
- store that or those transmitted message(s) in the message storage/exchange buffer-forming member;
- recover a plurality of redundant messages generated by the message storage/exchange buffer-forming member for the or each transmitted message; and
- send those redundant messages to distinct external buses through the corresponding interfaces;

the message exchange controller-forming means are further able to:
- recover at least one message transmitted by at least one message production unit through the corresponding interface;
- process that or those transmitted message(s) so as to generate a plurality of redundant messages for the or each transmitted message, to store them in the message storage/exchange buffer-forming member;
- recover the redundant messages from the message storage/exchange buffer-forming member; and
- send them to separate external buses through the corresponding interfaces.

the message storage/exchange buffer-forming member is at least partially incorporated into the single component;

the message storage/exchange buffer-forming member is distinct and separate from the single component;

each redundant message comprises a tag making it possible to distinguish it in a group of redundant messages corresponding to a same transmitted message;

each transmitted or selected or redundant message comprises means for verifying its integrity;

the single component further comprises at least one interface for connecting to at least one external message storage member;

the message exchange controller-forming means are further able to recover redundant messages from distinct external storage members through corresponding interfaces;

the message exchange controller-forming means are further able to send redundant messages to distinct external storage members through the corresponding interfaces;

each message production/consumption unit is chosen from the group comprising local or remote information processing units, processors, computers, sensors, actuators and displays;

each external message communication bus is associated with a communication system chosen from the group comprising digital networks of the A664, A664 Part 7, A429 and A825 type, the ADC and Flexray fieldbus type, and IEEE 802.3 telecommunications type;

the single component is a hardware component assuming the form of a programmable gate array; and the single component is a hardware component assuming the form of an application-specific integrated circuit.

These features and advantages of the invention will appear more clearly upon reading the following description, provided solely as a non-limiting example, and done in reference to the appended drawings, in which:

FIG. 1 shows a message exchange and generic communications controller structure according to the invention.

Such a structure is for example usable in avionics applications, and in particular for redundant avionics communication systems.

Figure 1:
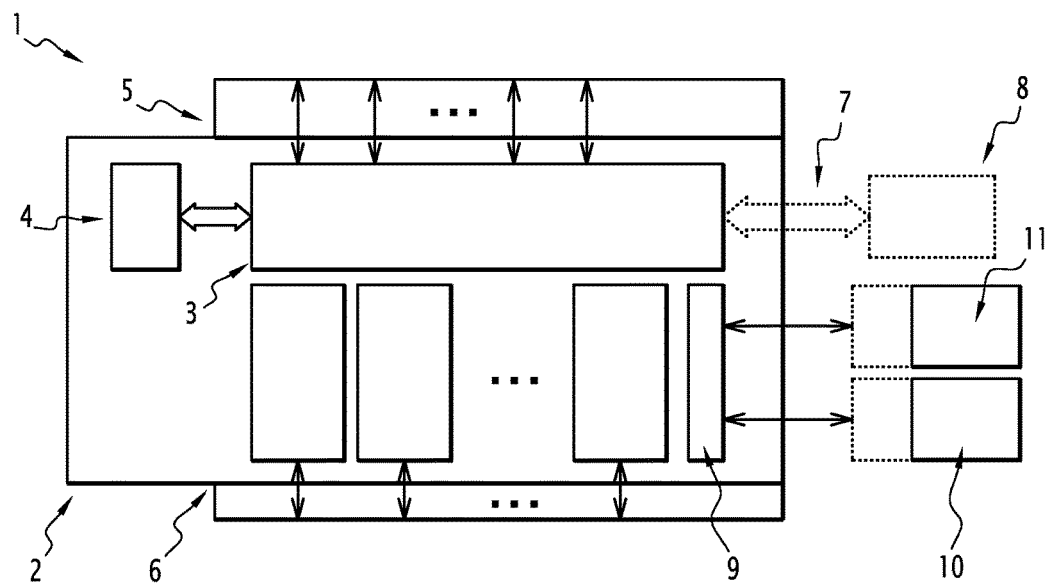
FIG. 1 is a block diagram illustrating an example embodiment of a message exchange and generic communications controller structure according to the invention, the structure comprising exchange controller-forming means.

This exchange controller structure is designated by general reference 1 in FIG. 1 and assumes the general form of a single component, designated by general reference 2, further comprising message exchange controller-forming means designated by general reference 3.

The single component 2 is for example a hardware component assuming the form of a field-programmable gate array (FPGA) or an application-specific integrated circuit (ASIC).

The message exchange controller-forming means 3 are associated with different elements, including a member forming a message storage/exchange buffer designated by general reference 4 in FIG. 1.

In the example illustrated in FIG. 1, the message storage/exchange buffer-forming member 4 is completely incorporated into the single component 2.

Of course, other embodiments of this member 4 can be considered.

Thus, for example, this storage/exchange buffer-forming member 4 may be partially incorporated into this single component 2, and in the exterior portion thereof while being connected to the component 2.

The member 4 may also be provided to be completely external to that single component 2, while being connected thereto by any appropriate means such as off-board connecting means, thus allowing off-board placement or a physically remote extension of the single component 2.

According to other particularities, the message storage/exchange buffer-forming member 4 is organized by configuration into elementary structures associated with one or more messages each, in a partitioned manner and with controlled access.

In that case, the access to these elementary structures may be authorized by elementary structure by elementary structure configuration, by one or more message production/consumption units as well as one or more external communication buses and one or more storage units.

Furthermore, the access to these elementary structures is temporally deterministic and has a time-based expiration that can be calculated irrespective of the access to the different message production/consumption units and the different external communication buses and different storage units.

The message exchange controller-forming means 3 are also associated with a member forming interfaces for multiple connections to several message production/consumption units, one connection interface being associated with one message production/consumption unit.

This member interfaces for multiple connections is designated by general reference 5 in FIG. 1 and will be described in more detail below.

Likewise, the message exchange controller-forming means 3 are associated with a member forming that interfaces for multiple connections to several external message communication buses, one connection interface being associated with one external message communication bus.

This member forming interfaces for multiple connections to several external message communication buses is designated by general reference 6 in FIG. 1.

Lastly, the message exchange controller-forming means 3 may also be associated with connecting means designated by general reference 7 in FIG. 1, for connecting those means to an external message storage member designated by general reference 8 in FIG. 1.

Alternatively, the message exchange controller-forming means 3 are associated with one or more external message storage members via one or more connecting interfaces.

In FIG. 1, one such connecting interface is designated by general reference 9 and is connected to external message storage members designated in this figure by general references 10 and 11, respectively.

Of course, different embodiments of these connecting means and these message storage means or units can also be considered.

In fact, the single component 2 as described may for example assume the form of a configurable logic circuit and for example be implemented in the form of an FPGA or ASIC logic circuit of an appropriate type.

Other models of this component may of course be considered.

In the exchange controller structure 1 shown in FIG. 1, the exchange control means 3 are arranged to allow connections of:

the member 5 forming interfaces for multiple connections of the message production/consumption units to each other, directly, the member 5 forming interfaces for multiple connections of the message production/consumption units to each other, through the message storage/exchange buffer-forming member 4, the member 5 forming interfaces for multiple connections of the message production/consumption units to the member 6 forming interfaces for multiple connections of the external message communication buses, through the message storage/exchange buffer-forming member 4, the member 6 forming interfaces for multiple connections of the external message communication buses through the message storage/exchange buffer-forming member 4, including between the reception and transmission parts of each external communication bus, and the member 5 forming interfaces for multiple connections of the message production/consumption units to the member 6 forming interfaces for multiple connections with external message communication buses, as well as to each other, through the message storage/exchange buffer-forming member 4.

One can then see that in the exchange controller structure 1, the exchange controller-forming means 3 are arranged to allow multiple connections between the various interface-forming members and storage/exchange members.

Likewise, the exchange controller-forming means 3 are also for example arranged to allow connections of:

the member 5 forming interfaces for multiple connections to message production/consumption units with members forming interfaces for multiple connections to one or more message storage/exchange members 8, 10 or 11 through the message storage/exchange buffer-forming member 4, and the member 6 forming interfaces for multiple connections to external message communication buses with the member forming interfaces for multiple connection interfaces to one or more message storage members 8, 10 or 11 through the message storage/exchange buffer-forming member 4.

Thus, the exchange controller-forming means 3 constitute a sort of connecting node for the various interface-forming members and other members, for example storage members, previously described.

This then for example makes it possible to connect message production/consumption units to one or more external communication buses.

In turn, each external communication bus is associated with a communication system.

One such communication system is for example chosen from the group comprising networks of the A664, A664 part 7, A429 and A825 avionics type, ADC or Flexray fieldbus type, and IEEE 802.3 telecommunications type.

The communication systems associated with the member 6 forming interfaces for multiple connections can be of the same type or different types.

Each message production/consumption unit is for example a piece of avionics equipment able to communicate with other pieces of avionics equipment via one or more avionics communication systems associated with the member 6 forming interfaces for multiple connections.

Thus, such a piece of equipment is for example chosen from the group comprising local or remote information processing units, processors, computers, sensors, actuators and displays.

These message production/consumption units are therefore able to send and receive digital data in the form of discrete messages M.

For message production/consumption units corresponding to sensitive avionics applications, each received or transmitted message M may be backed up by one or more redundant messages MR. The set of these redundant messages MR defines a group GMR of redundant messages corresponding to that received or transmitted message M.

Each redundant message MR comprises a tag E making it possible to distinguish it in that group of redundant messages GMR in a unique and certain manner. This tag E is for example defined by a "TAG message" for example comprising a sequential number of that message MR.

For its part, each redundant message MR or received or transmitted message M may comprise its own means for verifying its integrity. These verification means for example comprise an additional message MA built using a cyclic redundancy of the corresponding message M or MR or other encoding techniques.

Furthermore, in order to increase the dissimilarity level between the redundant messages corresponding to a same group of redundant messages GMR, it is possible to use additional encoding techniques.

Lastly, this dissimilarity level is also increased by using a physical redundancy of the communication systems. Thus, homogenous or heterogeneous communication systems sending the redundant messages MR may be made physically redundant with respect to one another.

Similarly, the set of homogenous or heterogeneous redundant communication systems defines a group GSR of redundant communication systems. Each communication system in this group GSR defines a redundancy plane and sends a redundant message MR from the group of redundant messages GMR.

The exchange controller structure 1 is suitable for processing the redundant messages MR belonging to a same group of redundant messages GMR corresponding to an original message M.

Figure 2:
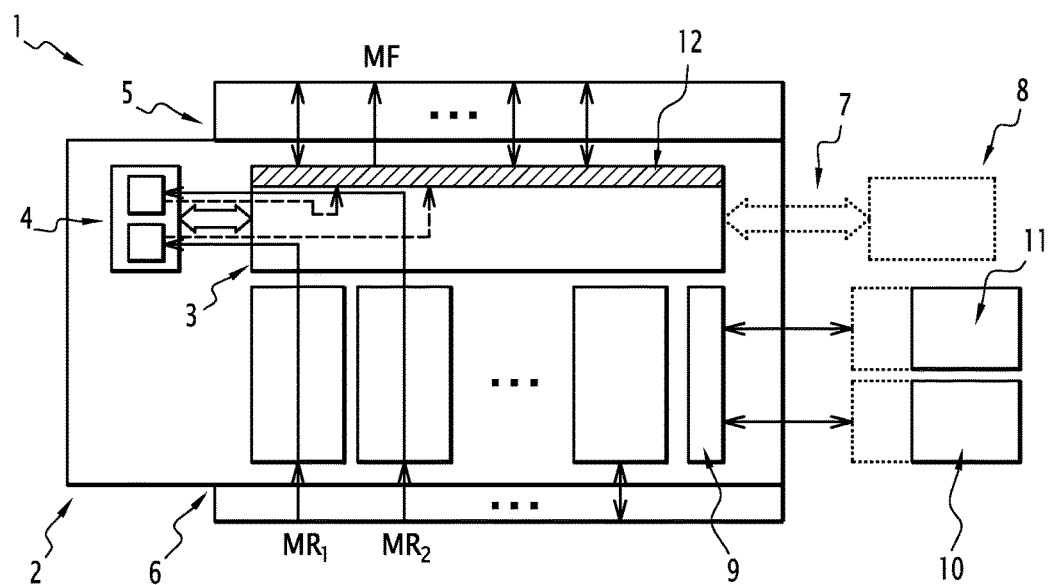
FIGS. 2 and 3 are block diagrams illustrating different operating examples, in reception mode, of the message exchange controller-forming means of the structure of FIG. 1.
Figure 3:
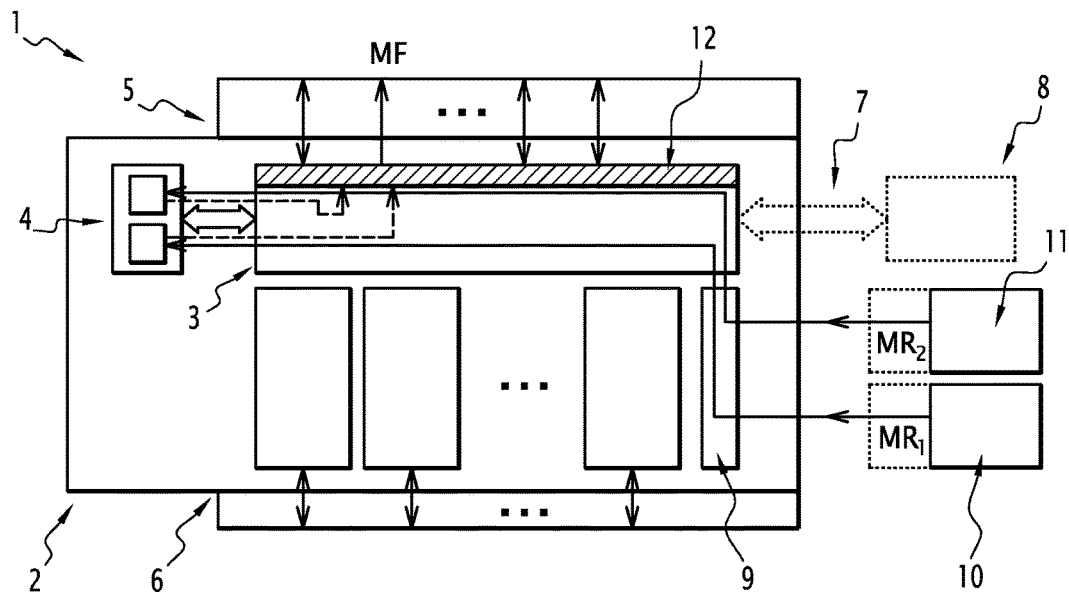

According to a first operating mode illustrated in FIGS. 2 and 3, the structure 1 is suitable for processing redundant messages MR received from different communication systems in a same group of redundant communication systems GSR.

This first operating mode corresponds to the operation of the means 3 for reception.

In fact, as illustrated in FIG. 2, the exchange controller-forming means 3 are able to recover the redundant messages $MR_1$ and $MR_2$ from distinct external buses through the corresponding interfaces.

These external buses are associated with the redundant communication systems making up the group of redundant communication systems GSR.

The exchange controller-forming means 3 are further able to store these redundant messages $MR_1$ and $MR_2$ in the message storage/exchange buffer-forming member 4 and to recover those redundant messages $MR_1$ and $MR_2$ from that member 4.

Lastly, the exchange controller-forming means 3 comprise a processing layer designated by general reference 12 in FIGS. 2 and 3 to process the redundant messages $MR_1$ and $MR_2$ after they have been recovered from the member 4.

In particular, this processing layer 12 makes it possible to select from among these redundant messages $MR_1$ and $MR_2$, or to generate using those messages, a resultant message MF so as to send it to one or more message consumption units.

Thus, this resultant or final message MF corresponds to the original message M associated with that group of redundant messages GMR.

Such processing for example comprises verifying the integrity of each redundant message $MR_1$ and $MR_2$ using corresponding verification means, in order to select a message from among all of the redundant messages $MR_1$ and $MR_2$ whose integrity has been verified.

If the group GMR comprises more than two redundant messages (not illustrated in FIG. 2), such processing may comprise comparing all of the redundant messages from that group GMR to each other in order to select a majority message therefrom. In other words, this type of processing corresponds to a majority vote.

Of course, other types of processing of redundant messages $MR_1$ and $MR_2$ and selecting or generating a resultant message MF to be sent are also possible.

In the example of FIG. 3, the redundant messages $MR_1$ and $MR_2$ are from external storage members 10 and 11, respectively. Thus, the exchange controller-forming means 3 are able to recover these redundant messages $MR_1$ and $MR_2$ through the corresponding interface(s) to process them as described above.

Figure 4:
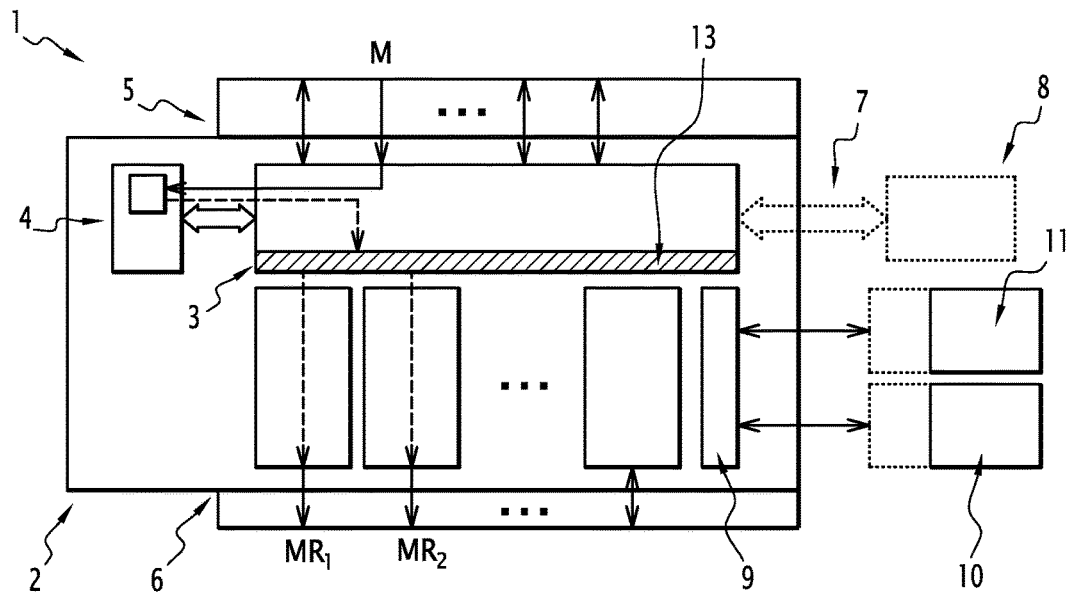
FIGS. 4 to 8 are block diagrams illustrating different operating examples, in transmission mode, of the message exchange controller-forming means the structure of FIG. 1.
Figure 5:
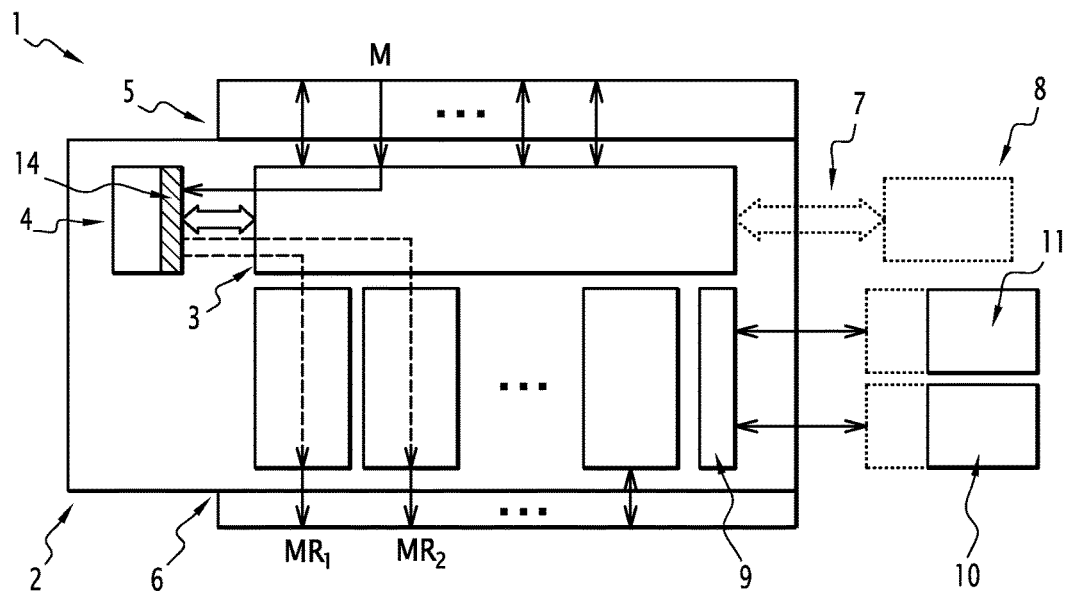
Figure 6:
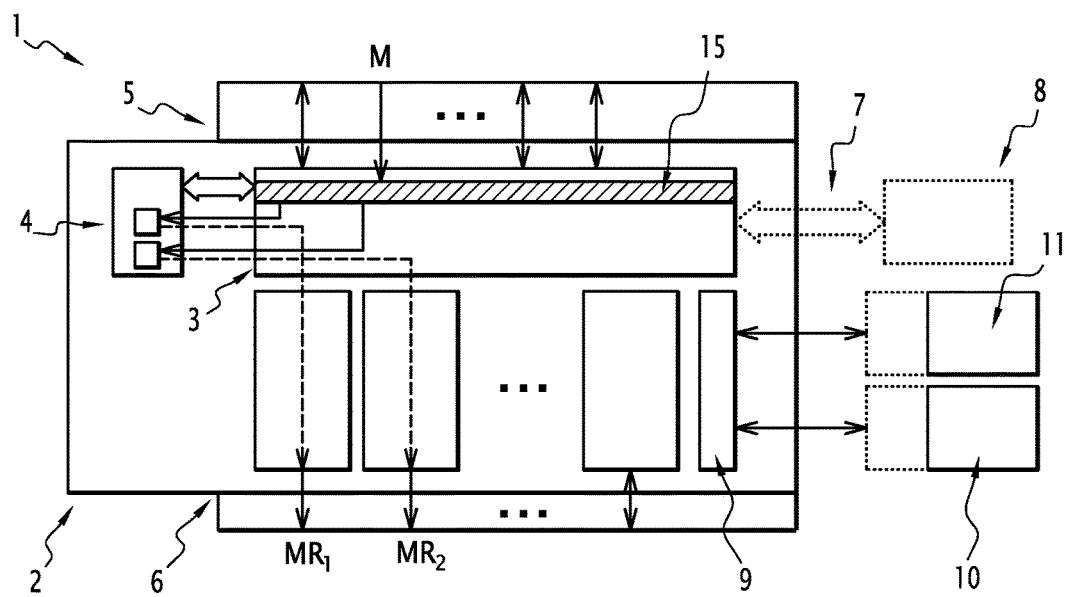

According to a second embodiment illustrated in FIGS. 4 to 6, the exchange controller structure 1 is suitable for processing redundant messages MR of the group GMR in order to send those redundant messages to different communication systems belonging to a same group of redundant communication systems GSR.

This second operating mode corresponds to the operating mode of the means 3 for transmission.

Thus, as illustrated in FIG. 4, the message exchange controller-forming means 3 are able to recover message M transmitted by a message production unit through the corresponding interface.

The means 3 are able to store this transmitted message M in the message storage/exchange buffer-forming member 4 and to recover that message M from that member 4.

Lastly, the means 3 comprise a processing layer designated in FIG. 4 by general reference 13 making it possible to generate redundant messages $MR_1$ and $MR_2$ for that transmitted message M, to send them to distinct external buses through the corresponding interfaces.

These external buses are associated with the set of redundant communication systems making up the group of redundant communication systems GSR.

More particularly, the generation of redundant messages $MR_1$ and $MR_2$ by the processing layer 13 for example consists of duplicating the original message M while adding the additional messages MA thereto constituting the verification means for those redundant messages $MR_1$ and $MR_2$. These additional messages MA are generated using one of the techniques previously described.

Of course, other alternatives for generating redundant messages MR are also possible.

In the operating example illustrated in FIG. 5, the message exchange controller-forming means 3 are able to recover a message M transmitted by a message production unit through the corresponding interface and store that message M in the message storage/exchange buffer-forming member 4.

In this example, the storage/exchange buffer-forming member 4 comprises a processing layer designated by general reference 14 in this figure and making it possible to generate redundant messages $MR_1$ and $MR_2$ for the message M.

The operation of this layer 14 is similar to that of the processing layer 13 of FIG. 4.

The exchange controller-forming means 3 are able to recover the redundant messages $MR_1$ and $MR_2$ generated by the member 4 to send them to distinct external buses through the corresponding interfaces.

These external buses are associated with the set of redundant communication systems making up the group of redundant communication systems GSR.

In the operating example illustrated in FIG. 6, the message exchange controller-forming means 3 are able to recover a message M transmitted by a message production unit through the corresponding interface.

In the same example, the means 3 further comprise a processing layer designated by general reference 15 in FIG. 6 making it possible to generate redundant messages $MR_1$ and $MR_2$ for that message M.

The operation of this layer 15 is similar to that of the processing layers 13 and 14 in FIGS. 4 and 5, respectively.

The message exchange controller-forming means 3 are further able to store these redundant messages $MR_1$ and $MR_2$ in the message storage/exchange buffer-forming member 4, to recover them from that member 4, and to send them to distinct external buses through the corresponding interfaces.

These external buses are associated with the set of redundant communication systems making up the group of redundant communication systems GSR.

It should also be noted that in the operating examples shown in FIGS. 4 to 6, the message exchange controller-forming means 3 are able to send the generated redundant messages $MR_1$ and $MR_2$ to the external storage members 10 and 11 through the corresponding interface(s).

Figure 7:
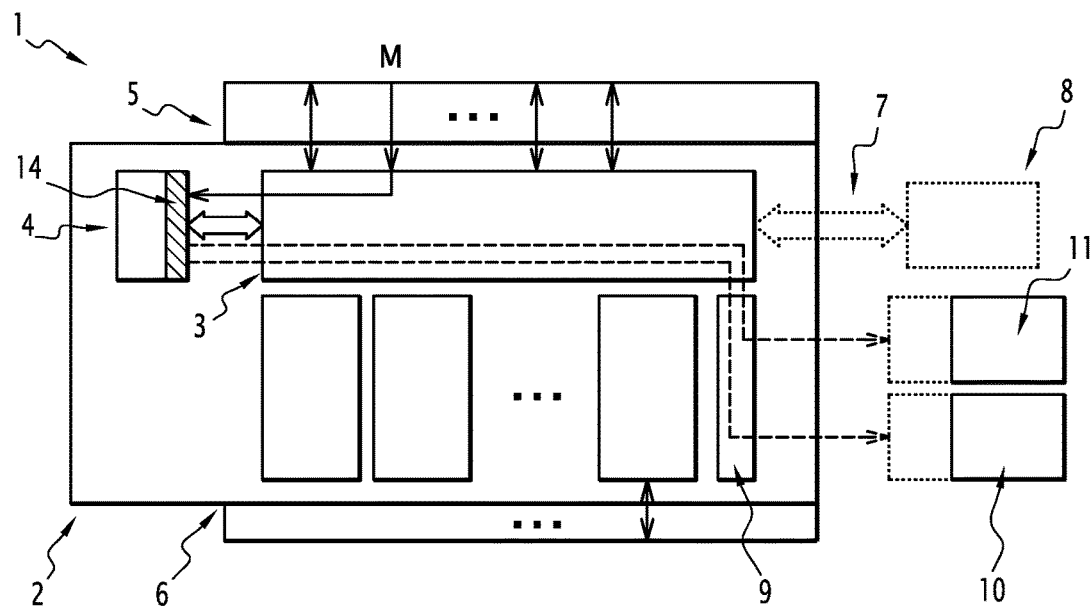

This is in particular illustrated in FIG. 7, in which the processing layer 14 is able to transmit two redundant messages to the external storage members 10 and 11 through the corresponding interface.

Figure 8:
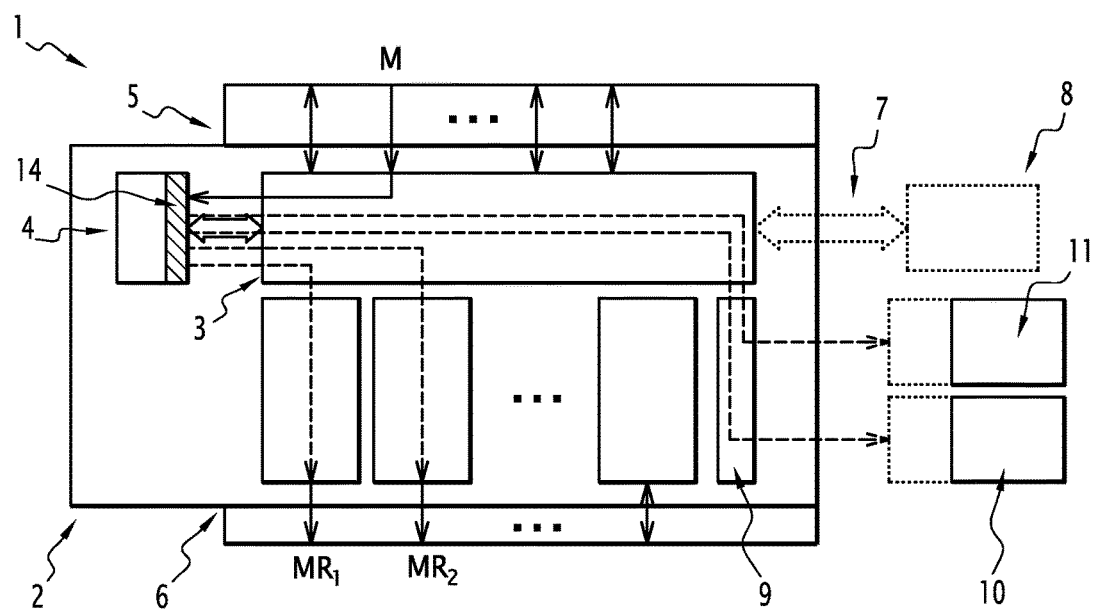

FIG. 8 illustrates another operating example in which the processing layer 14 is able to transmit redundant messages to distinct external buses and to the external storage members 10 and 11 through the corresponding interface.

Similarly, the processing layers 13 and 15 respectively illustrated in FIGS. 4 and 6 also make it possible to transmit redundant messages to the external storage members and/or distinct external buses through the corresponding interfaces.

Of course, other operating modes and embodiments of the exchange controller structure 1 can also be considered.

One can then see that such an exchange controller structure makes it possible to manage a physical redundancy of different homogenous or heterogeneous communication systems. Such management is provided by compact means that are easy to implement and inexpensive.

Furthermore, the level of segregation and/or dissimilarity of the redundant messages does not change passing through the exchange controller-forming means, which ensures the independence of each redundancy plane associated with a redundant message.

The invention claimed is:

1. A message exchange and generic communication controller structure for redundant avionics communication systems, assuming the form of a single component comprising a messages exchanges controller, associated with at least:
   a member forming a messages storage/exchange buffer;
   a member forming connection interfaces for connecting to several messages production/consumption units, one connection interface being associated with one messages production/consumption unit;
   a member forming connection interfaces for connecting to several external messages communication buses, one connection interface being associated with one external messages communication bus;
wherein the messages exchanges controller is able to:
   recover redundant messages from separate external buses through the corresponding interfaces;
   store those redundant messages in the member forming the messages storage/exchange buffer;
   recover those redundant messages from the member forming the messages storage/exchange buffer; and process those redundant messages so as to generate a resultant message, to send it to at least one messages consumption unit through the corresponding interface;

the member forming the storage/exchange buffer is partitioned into distinct elementary structures, each distinct elementary structure storing and/or processing independently one entire redundant messages corresponding to a same resultant message;

the messages exchanges controller is further able to:
  recover at least one message transmitted by at least one messages production unit through the corresponding interface;
  store that or those transmitted message(s) in the member forming the messages storage/exchange buffer;
  recover that or those transmitted message(s) from the member forming the messages storage/exchange buffer; and
  process that or those transmitted message(s) so as to generate a plurality of redundant messages for the or each transmitted message, to send them to separate external buses through the corresponding interfaces, the messages exchanges controller comprising a processing layer able to generate the plurality of redundant messages, and wherein the messages exchanges controller is further able to:
recover a plurality of redundant messages generated by the member forming the messages storage/exchange buffer for the or each transmitted message, wherein the member forming the messages storage/exchange buffer comprises a processing layer completely incorporated into the member forming the messages storage/exchange buffer, the processing layer generating the plurality of redundant messages for the or each transmitted message; and
send those redundant messages to distinct external buses through the corresponding interfaces.

2. The message exchange and generic communication controller structure according to claim 1, wherein the member forming the messages storage/exchange buffer is at least partially incorporated into the single component.

3. The message exchange and generic communication controller structure according to claim 1, wherein the member forming the messages storage/exchange buffer is distinct and separate from the single component.

4. The message exchange and generic communication controller structure according to claim 1, wherein each redundant message comprises a tag making it possible to distinguish it in a group of redundant messages corresponding to a same transmitted message.

5. The message exchange and generic communication controller structure according to claim 1, wherein each transmitted or selected or redundant message comprises means for verifying its integrity.

6. The message exchange and generic communication controller structure according to claim 1, wherein the single component further comprises at least one interface for connecting to at least one external message storage member.

7. The message exchange and generic communication controller structure according to claim 6, wherein the messages exchanges controller is further able to recover redundant messages from distinct external storage members through corresponding interfaces.

8. The message exchange and generic communication controller structure according to claim 6, wherein the messages exchanges controller is further able to send redundant messages to distinct external storage members through the corresponding interfaces.

9. The message exchange and generic communication controller structure according to claim 1, wherein each messages production/consumption unit is chosen from the group comprising:
  local or remote information processing units,
  processors,
  computers,
  sensors,
  actuators, and
  displays.

10. The message exchange and generic communication controller structure according to claim 1, wherein each external messages communication bus is associated with a communication system chosen from the group comprising digital networks of the A664, A664 Part 7, A429 and A825 avionic type, the ADC and Flexray fieldbus type, and IEEE 802.3 telecommunications type.

11. The message exchange and generic communication controller structure according to claim 1, wherein the single component is a hardware component assuming the form of a programmable gates array.

12. The message exchange and generic communication controller structure according to claim 1, wherein the single component is a hardware component assuming the form of an application-specific integrated circuit.

13. A message exchange and generic communication controller structure for redundant avionics communication systems, assuming the form of a single component comprising a messages exchanges controller, associated with at least:
  a member forming a messages storage/exchange buffer;
  a member forming connection interfaces for connecting to several messages production/consumption units, one connection interface being associated with one messages production/consumption unit;
  a member forming connection interfaces for connecting to several external messages communication buses, one connection interface being associated with one external messages communication bus;

wherein the messages exchanges controller is able to:
  recover redundant messages from separate external buses through the corresponding interfaces;
  store those redundant messages in the member forming the messages storage/exchange buffer;
  recover those redundant messages from the member forming the messages storage/exchange buffer; and
  process those redundant messages so as to generate a resultant message, to send it to at least one messages consumption unit through the corresponding interface;

the member forming the storage/exchange buffer is partitioned into distinct elementary structures, each distinct elementary structure storing and/or processing independently one entire redundant messages corresponding to a same resultant message;

the messages exchanges controller is further able to:
  recover at least one message transmitted by at least one messages production unit through the corresponding interface;
  store that or those transmitted message(s) in the member forming the messages storage/exchange buffer;
  recover that or those transmitted message(s) from the member forming the messages storage/exchange buffer; and
  process that or those transmitted message(s) so as to generate a plurality of redundant messages for the or each transmitted message, to send them to separate external buses through the corresponding interfaces, the messages exchanges controller comprising a processing layer able to generate the plurality of redundant messages;

wherein the messages exchanges controller is further able to:

recover a plurality of redundant messages generated by the member forming the messages storage/exchange buffer for the or each transmitted message, wherein the member forming the messages storage/exchange buffer comprises a processing layer completely incorporated into the member forming the messages storage/exchange buffer, the processing layer generating the plurality of redundant messages for the or each transmitted message;

send those redundant messages to distinct external buses through the corresponding interfaces; and wherein each redundant message comprises a tag making it possible to distinguish it in a group of redundant messages corresponding to a same transmitted message.

14. A message exchange and generic communication controller structure for redundant avionics communication systems, assuming the form of a single component comprising a messages exchanges controller, associated with at least:

a member forming a messages storage/exchange buffer;

a member forming connection interfaces for connecting to several messages production/consumption units, one connection interface being associated with one messages production/consumption unit;

a member forming connection interfaces for connecting to several external messages communication buses, one connection interface being associated with one external messages communication bus;

wherein the messages exchanges controller is able to:

recover redundant messages from separate external buses through the corresponding interfaces;

store those redundant messages in the member forming the messages storage/exchange buffer;

recover those redundant messages from the member forming the messages storage/exchange buffer; and process those redundant messages so as to generate a resultant message, to send it to at least one messages consumption unit through the corresponding interface;

the member forming the storage/exchange buffer is partitioned into distinct elementary structures, each distinct elementary structure storing and/or processing independently one entire redundant message corresponding to a same resultant message;

wherein the messages exchanges controller is further able to recover at least one message transmitted by at least one messages production unit through the corresponding interface;

store that or those transmitted message(s) in the member forming the messages storage/exchange buffer;

recover that or those transmitted message(s) from the member forming the messages storage/exchange buffer, wherein the member forming the message storage/exchange buffer is completely incorporated into the message exchange and generic communication controller structure; and process that or those transmitted message(s) so as to generate a plurality of redundant messages for the or each transmitted message, to send them to separate external buses through the corresponding interfaces, the messages exchanges controller comprising a processing layer able to generate the plurality of redundant messages, wherein the messages exchanges controller is further able to:

recover a plurality of redundant messages generated by the member forming the messages storage/exchange buffer for the or each transmitted message, wherein the member forming the messages storage/exchange buffer comprises a processing layer completely incorporated into the member forming the messages storage/exchange buffer, the processing layer generating the plurality of redundant messages for the or each transmitted message;

send those redundant messages to distinct external buses through the corresponding interfaces; and wherein each redundant message comprises a tag making it possible to distinguish it in a group of redundant messages corresponding to a same transmitted message.

* * * * *